(12) United States Patent
Kakuyama et al.

(10) Patent No.: US 6,619,032 B2
(45) Date of Patent: Sep. 16, 2003

(54) ENGINE EXHAUST PURIFICATION DEVICE

(75) Inventors: Masatomo Kakuyama, Yokohama (JP); Shigeaki Kakizaki, Yokohama (JP); Osamu Matsuno, Ayase (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/958,935

(22) PCT Filed: Feb. 23, 2001

(86) PCT No.: PCT/JP01/01366
§ 371 (c)(1), (2), (4) Date: Oct. 16, 2001

(87) PCT Pub. No.: WO01/63105
PCT Pub. Date: Aug. 30, 2001

(65) Prior Publication Data
US 2002/0152742 A1 Oct. 24, 2002

(30) Foreign Application Priority Data
Feb. 25, 2000 (JP) .......................................... 2000-49185

(51) Int. Cl.$^7$ ................................................. F01N 3/00
(52) U.S. Cl. ............................. 60/277; 60/274; 60/285
(58) Field of Search .......................... 60/274, 276, 285, 60/277, 299

(56) References Cited

U.S. PATENT DOCUMENTS

| 5,293,740 A | * 3/1994 | Heppner et al. | 60/274 |
|---|---|---|---|
| 5,335,538 A | * 8/1994 | Blischke et al. | 60/277 |
| 5,363,646 A | 11/1994 | Orzel et al. | 60/274 |
| 5,661,972 A | * 9/1997 | Katoh et al. | 60/276 |
| 5,678,402 A | * 10/1997 | Kitagawa et al. | 60/276 |
| 5,842,339 A | * 12/1998 | Bush et al. | 60/274 |
| 5,842,340 A | 12/1998 | Bush et al. | 60/274 |
| 5,901,552 A | 5/1999 | Schnaibel et al. | 60/274 |
| 5,966,930 A | * 10/1999 | Hatano et al. | 60/276 |
| 6,116,021 A | * 9/2000 | Schumacher et al. | 123/674 |
| 6,289,673 B1 | 9/2001 | Tayama et al. | 60/285 |

FOREIGN PATENT DOCUMENTS

| JP | 09-228873 | 9/1997 |
|---|---|---|
| JP | 2000120475 | 4/2000 |
| WO | 98/38415 | 9/1998 |
| WO | 98/38416 | 9/1998 |

* cited by examiner

Primary Examiner—Thomas Denion
Assistant Examiner—Diem Tran
(74) Attorney, Agent, or Firm—Foley & Lardner

(57) ABSTRACT

A microprocessor (6) computes an oxygen storage amount of a catalyst (3) separately for a high speed component and a low speed component in accordance with real characteristic. A target air-fuel ratio of an engine (1) is computed and air-fuel ratio control of the engine (1) it is performed so that the high speed component is constant. The deterioration of the catalyst (3) is determined by integrating the high speed component of the oxygen storage amount computed during the air-fuel ratio control process for a predetermined number of times, and comparing its average value with a determining value. The oxygen storage amount of the high speed component which is sensitive to catalyst deterioration is integrated so as to obtain a highly precise determining result to determine the deterioration.

12 Claims, 16 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst is constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean, and conversely, oxygen stored in the catalyst is released even if the air-fuel ratio of the exhaust flowing into the catalyst temporarily becomes rich, so the catalyst atmosphere can be maintained at the stoichiometric air-fuel ratio.

Therefore, in an exhaust purification device performing this type of control, it is required to calculate the oxygen storage amount precisely to maintain the conversion efficiency of the catalyst at a high level, and various methods of computing the oxygen storage amount have been proposed.

SUMMARY OF THE INVENTION

However, as the maximum oxygen storage amount slightly decreases due to catalyst deterioration, the target amount undergoes a relative shift from a suitable value and the conversion efficiency of the catalyst decreases, i.e., there is a risk that the exhaust performance will fall with time. To determine the catalyst deterioration, oxygen sensors may be installed upstream and downstream of the catalyst, and the deterioration determined by comparing the number of times their outputs invert, or alternatively, the difference of the maximum value and minimum value of the output each time the output of the downstream oxygen sensor invert during a predetermined number of times that the output of the upstream oxygen sensor inverts, may be computed, and deterioration determined when its average value is greater than a reference value.

In the above air-fuel ratio control using the three-way catalyst, if an A/F sensor (linear oxygen sensor) having linear characteristic according to the air-fuel ratio upstream is provided upstream of the catalyst to precisely determine the oxygen storage amount, as the amplitude of the output of the A/F sensor is small, and the number of inversions of the downstream oxygen sensor decreases the more stably air-fuel ratio control is performed, the catalyst deterioration determining frequency is smaller in the above prior art, and in the worst case, deterioration may not be determined at all.

It is therefore an object of this invention, which was conceived in view of the above problems, to provide an exhaust purification device permitting determination of catalyst deterioration without depending on the output inversion of the exhaust oxygen sensor.

In order to achieve above object, this invention provides an engine exhaust purification device comprises a catalyst provided in an engine exhaust passage, a sensor which detects an exhaust characteristic flowing into the catalyst, and a microprocessor programmed to compute an oxygen storage amount of the catalyst using the detected exhaust characteristic, to compute a target air-fuel ratio of the engine based on the computed oxygen storage amount such that the oxygen storage amount of the catalyst is a predetermined target value, and to determine a deterioration of the catalyst based on an integrated value of the oxygen storage amount for a predetermined time.

Further this invention provides an engine exhaust purification device comprises, a catalyst provided in an engine exhaust passage, a first sensor which detects an exhaust characteristic of flowing into the catalyst, a second sensor which detects an air-fuel ratio of exhaust flowing out of the catalyst, and a microprocessor programmed to compute the oxygen storage amount of the catalyst using the detected exhaust characteristic, to perform reset processing which initializes the oxygen storage amount to a maximum value when the air-fuel ratio of the exhaust from the catalyst detected via the second sensor exceeds a lean determining value, and initializes the oxygen storage amount to a minimum value when the air-fuel ratio of the exhaust from the catalyst detected via the second sensor exceeds a rich determining value, to compute a target air-fuel ratio of an engine so that the oxygen storage amount of the catalyst is a predetermined target value based on the computed oxygen storage amount, and to compare a reset processing frequency with a determining value, and determine that the catalyst has deteriorated when the reset processing frequency exceeds the determining value.

DESCRIPTION OF THE PREFERRED EMBODIMENTS

Figure 1:
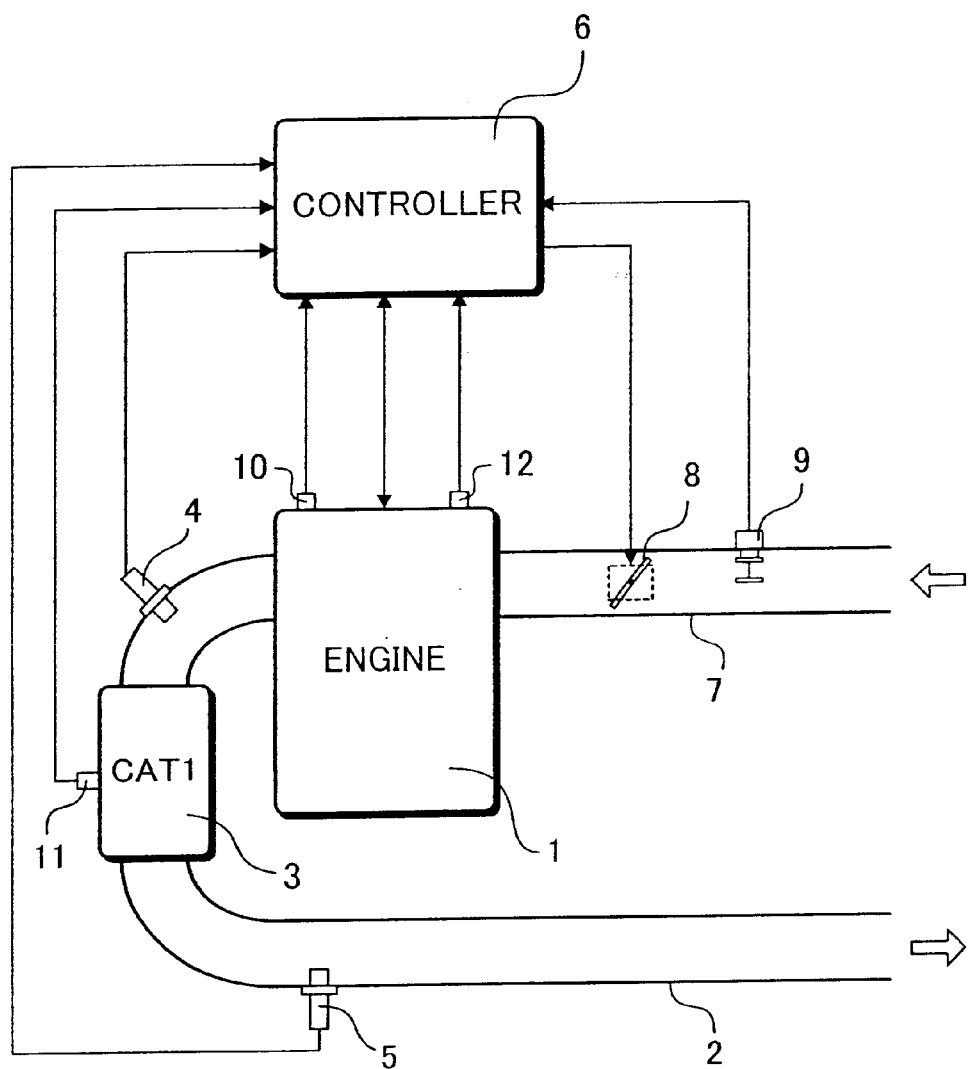
FIG. 1 is a schematic diagram of an exhaust purification device according to this invention.

Referring to FIG. 1 of the drawings, an exhaust passage 2 of an engine 1 is provided with a catalyst 3, front wide range air-fuel ratio sensor 4 (hereafter referred to as front A/F sensor), a rear oxygen sensor 5 and controller 6.

A throttle 8, and an air flow meter 9 which detects the intake air amount adjusted by the throttle 8, are provided in an intake passage 7 of the engine 1. In addition, a crank angle sensor 12 which detects the engine rotation speed of the engine 1 is provided.

The catalyst 3 is a catalyst having a three-way catalyst function. The catalyst 3 purifies NOx, HC and CO with maximum efficiency when the catalyst atmosphere is at the stoichiometric air-fuel ratio. The catalyst carrier of the catalyst 3 is coated with an oxygen storage material such as cerium oxide, and the catalyst 3 has the function of storing or releasing oxygen according to the air-fuel ratio of the inflowing exhaust (referred to hereafter as oxygen storage function).

Here, the oxygen storage amount of the catalyst 3 may be partitioned into a high speed component HO2 which is stored and released by a noble metal in the catalyst 3 (Pt, Rh, Pd), and a low speed component LO2 which is stored and released by the oxygen storage material in the catalyst 3. The low speed component LO2 represents the storage and release of a larger amount of oxygen than the high speed component HO2, but its storage/release rate is slower than that of the high speed component HO2.

Further, this high speed component HO2 and low speed component LO2 have characteristics as follows:

When oxygen is stored, oxygen is stored preferentially as the high speed component HO2, and begins to be stored as the low speed component LO2 when the high speed component HO2 has reached a maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component HO2 is larger than the predetermined value, oxygen is released from both the high speed component HO2 and low speed component LO2 so that the ratio of the low speed component LO2 to the high speed component HO2 does not vary.

Figure 2:
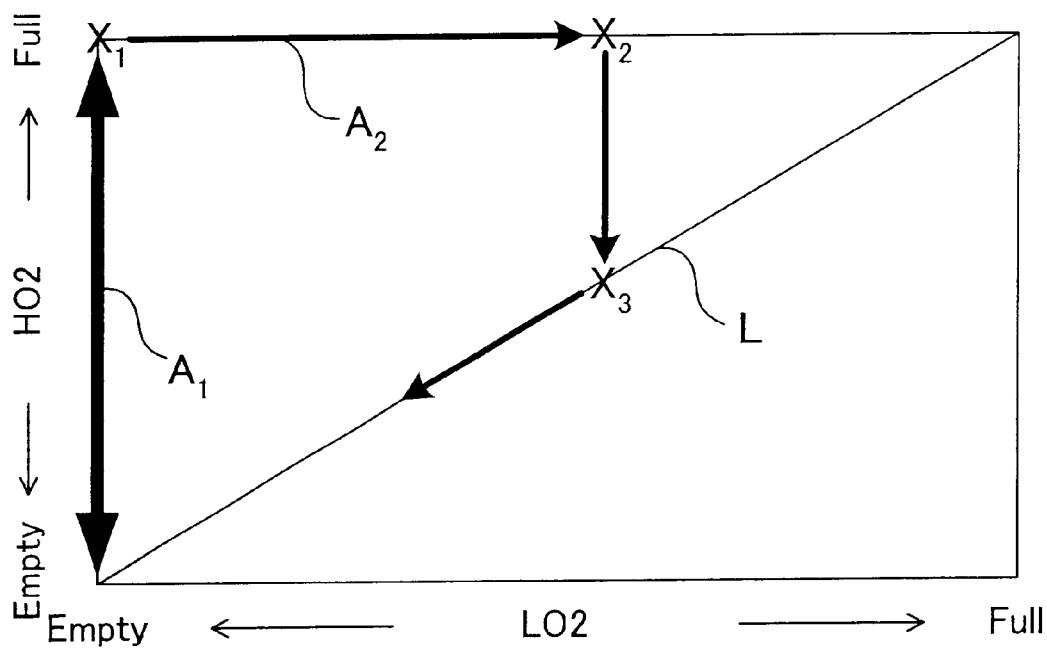
FIG. 2 is a diagram showing the oxygen release characteristics of a catalyst.

FIG. 2 shows the experimental results for these characteristics. The vertical axis shows released amount from the high speed component HO2, and the horizontal axis shows released amount from the low speed component LO2. If three different amounts are experimentally released from effectively the same release start points ($X_1$, $X_2$, $X_3$), the release finish points are $X_1'$, $X_2'$, $X_3'$ and the ratio of low speed component to high speed component is constant when release is complete.

As a result, it appears that when oxygen release begins, the oxygen is released from the high speed component so that the high speed component decreases, and when the ratio of low speed component to high speed component reaches a predetermined ratio, this ratio is subsequently maintained, i.e., oxygen is released while moving on a straight line L shown in the Figure. Here, the low speed component is from 5 to 15, and preferably approximately 10, relative to the high speed component 1. The same characteristics are obtained even when the release start point lies in the region below the line L.

When the release start point is in the region to the left of the line L (Y in the Figure), oxygen is released effectively along the straight line connecting the start point and finish point Y'.

Returning to FIG. 1, the front A/F sensor 4 provided upstream of the catalyst 3 outputs a voltage according to the air-fuel ratio of the exhaust flowing into the catalyst 3. The rear oxygen sensor 5 provided downstream of the catalyst 3 detects whether the exhaust air-fuel ratio downstream of the catalyst 3 is rich or lean with the stoichiometric air-fuel ratio as a threshold value. Here, an economical oxygen sensor was provided downstream of the catalyst 3, but an A/F sensor which can detect the air fuel ratio continuously can be provided instead.

The cooling water temperature sensor 10 which detects the temperature of the cooling water is fitted to the engine 1. The detected cooling water temperature is used for determining the running state of the engine 1, and also for estimating the catalyst temperature of the catalyst 3.

The controller 6 comprises a microprocessor, RAM, ROM and I/O interface, and it computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (e.g., half the maximum capacity HO2MAX of the high speed component), the controller 6 makes the air fuel ratio of the engine 1 rich, makes the air-fuel ratio of the exhaust flowing into the catalyst 3 rich, and decreases the high speed component HO2. Conversely, when it is less than the predetermined amount, the controller 6 makes the air fuel ratio of the engine 1 lean, makes the air-fuel ratio of the exhaust flowing into the catalyst 3 lean, increases the high speed component HO2, and maintains the high speed component HO2 of the oxygen storage amount constant.

A discrepancy may arise between the computed oxygen storage amount and real oxygen storage amount due to computational error, so the controller 6 resets the computational value of the oxygen storage amount with a predetermined timing based on the air-fuel ratio of the exhaust downstream of the catalyst 3, and corrects this discrepancy from the real oxygen storage amount.

Specifically, when it is determined that the air-fuel ratio downstream of the catalyst 3 is lean based on the output of the rear oxygen sensor 5, it is determined that at least the high speed component HO2 is maximum, and the high speed component HO2 is reset to maximum capacity. When it is determined by the rear oxygen sensor 5 that the air fuel ratio downstream of the catalyst 3 is rich, oxygen is no longer being released not only from the high speed component HO2 but also from the low speed component LO2, so the high speed component HO2 and low speed component LO2 are reset to minimum capacity.

Next, the control performed by the controller 6 will be described.

First, the computation of the oxygen storage amount will be described, followed by resetting of the computational value of the oxygen storage amount, and air-fuel ratio control of the engine 1 based on the oxygen storage amount.

Figure 3:
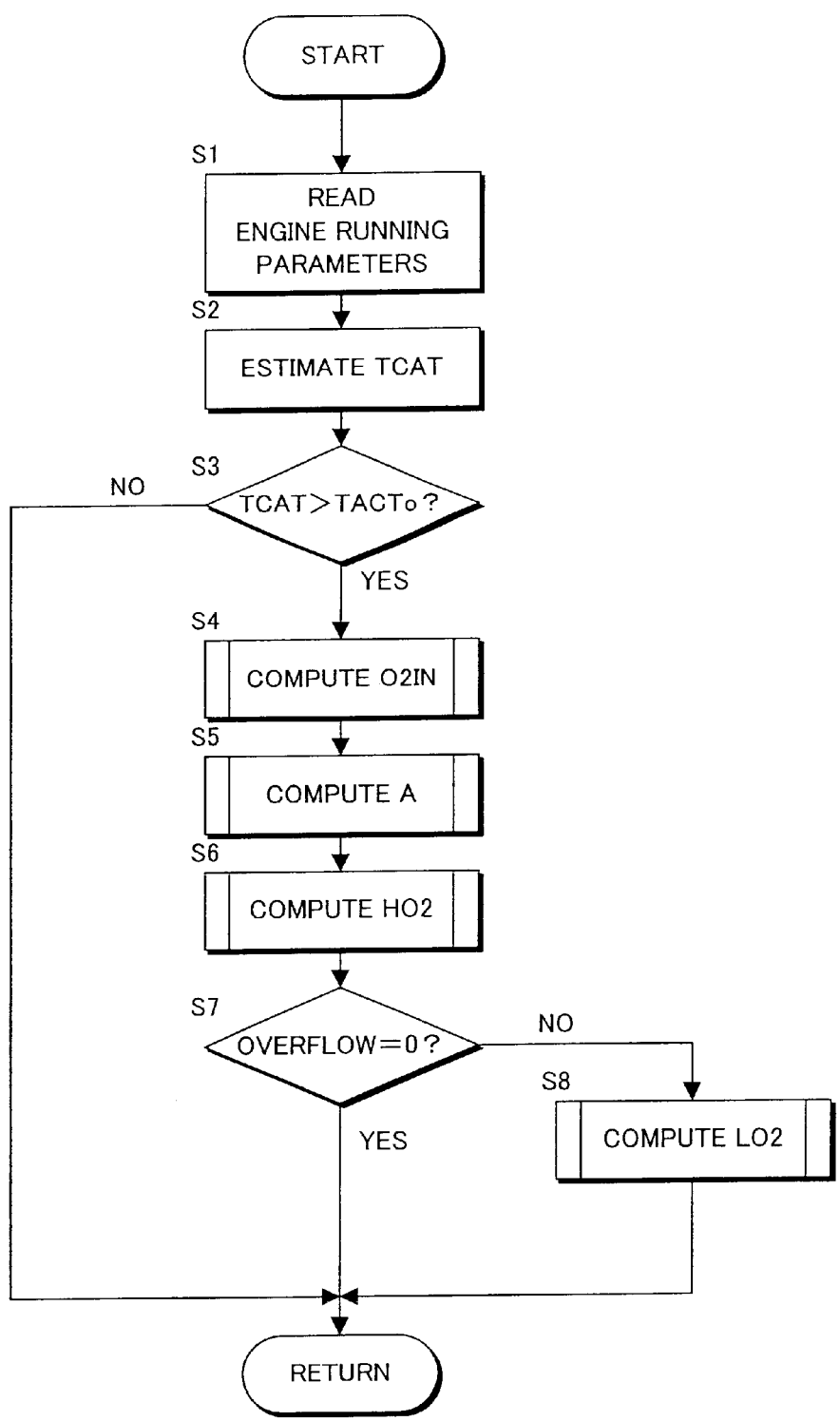
FIG. 3 is a flowchart showing a routine for computing an oxygen storage amount of the catalyst.

According to the routine as shown by FIG. 3, first, in a step S1, the outputs of the cooling water temperature sensor 10, crank angle sensor 12 and air flow meter 9 are read as running parameters of the engine 1. In a step S2, a temperature TCAT of the catalyst 3 is estimated based on these parameters. In a step S3, by comparing the estimated catalyst temperature TCAT and a catalyst activation temperature TACTo (e.g. 300° C.), it is determined whether or not the catalyst 3 has activated.

When it is determined that the catalyst activation temperature TACTo has been reached, the routine proceeds to a step S4 to compute the oxygen storage amount of the catalyst 3. When it is determined that the catalyst activation temperature TACTo has not been reached, processing is terminated assuming that the catalyst 3 does not store or release oxygen.

In the step S4, a subroutine (FIG. 4) for computing an oxygen excess/deficiency amount O2IN is performed, and the oxygen excess/deficiency amount of the exhaust flowing into the catalyst 3 is computed. In a step S5, a subroutine (FIG. 5) for computing an oxygen release rate A of the high speed component of the oxygen storage amount is performed, and the oxygen release rate A of the high speed component is computed.

Further, in a step S6, a subroutine (FIG. 6) for computing the high speed component HO2 of the oxygen storage amount is performed, and the high speed component HO2 and an oxygen amount OVERFLOW overflowing into the low speed component LO2 without being stored as the high speed component HO2, are computed based on the oxygen excess/deficiency amount O2IN and the oxygen release rate A of the high speed-component.

In a step S7, it is determined whether or not all of the oxygen excess/deficiency amount O2IN flowing into the catalyst 3 has been stored as the high speed component HO2 based on the overflow oxygen amount OVERFLOW. When all of the oxygen excess/deficiency amount O2IN has been stored as the high speed component (OVERFLOW=0), processing is terminated. In other cases, the routine proceeds to a step S8, a subroutine (FIG. 7) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed, but a temperature sensor 11 may also be attached to the catalyst 3 as shown in FIG. 1 and the temperature of the catalyst 3 measured directly.

When the catalyst temperature TCAT is less than the activation temperature TACTo, the oxygen storage amount is not computed, but the step S3 may be eliminated, and the effect of the catalyst temperature TCAT may be reflected in the oxygen release rate A of the high speed component or an oxygen storage/release rate B of the low speed component, described later.

Next, a subroutine performed from steps S4 to S6 and in the step S8 will be described.

Figure 4:
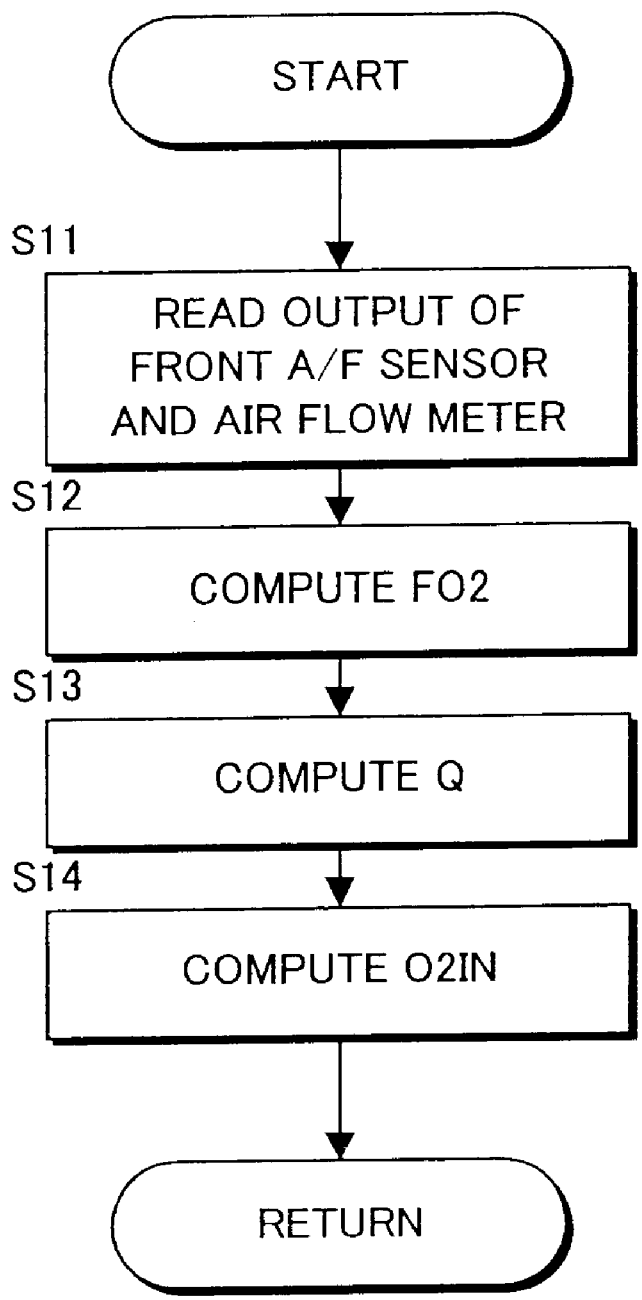
FIG. 4 is a flowchart showing a subroutine for computing an oxygen excess/deficiency amount in exhaust flowing into the catalyst.

FIG. 4 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount Q using a predetermined conversion table, and in a step S14, the intake air amount Q is multiplied by the excess/deficiency oxygen concentration FO2 to compute the excess/deficiency oxygen amount O2IN of the exhaust flowing into the catalyst 3.

As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich, and a positive value when it is lean.

Figure 5:
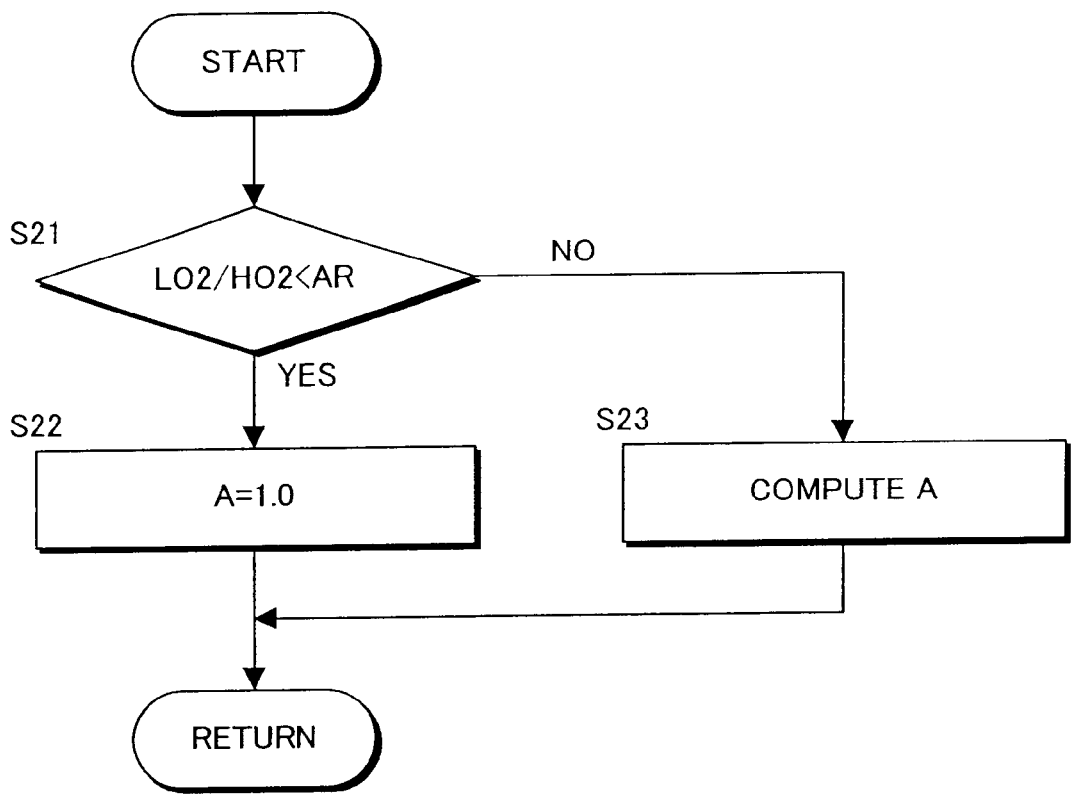
FIG. 5 is a flowchart showing a subroutine for computing an oxygen release rate of a high speed component.

FIG. 5 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in a step S21, it is determined whether or not a ratio LO2/HO2 of low speed component relative to the high speed component is less than a predetermined value AR (e.g. AR=10). When it is determined that the ratio LO2/HO2 is less than the predetermined value AR, i.e., when the high speed component HO2 is relatively larger than the low speed component LO2, the routine proceeds to a step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 6:
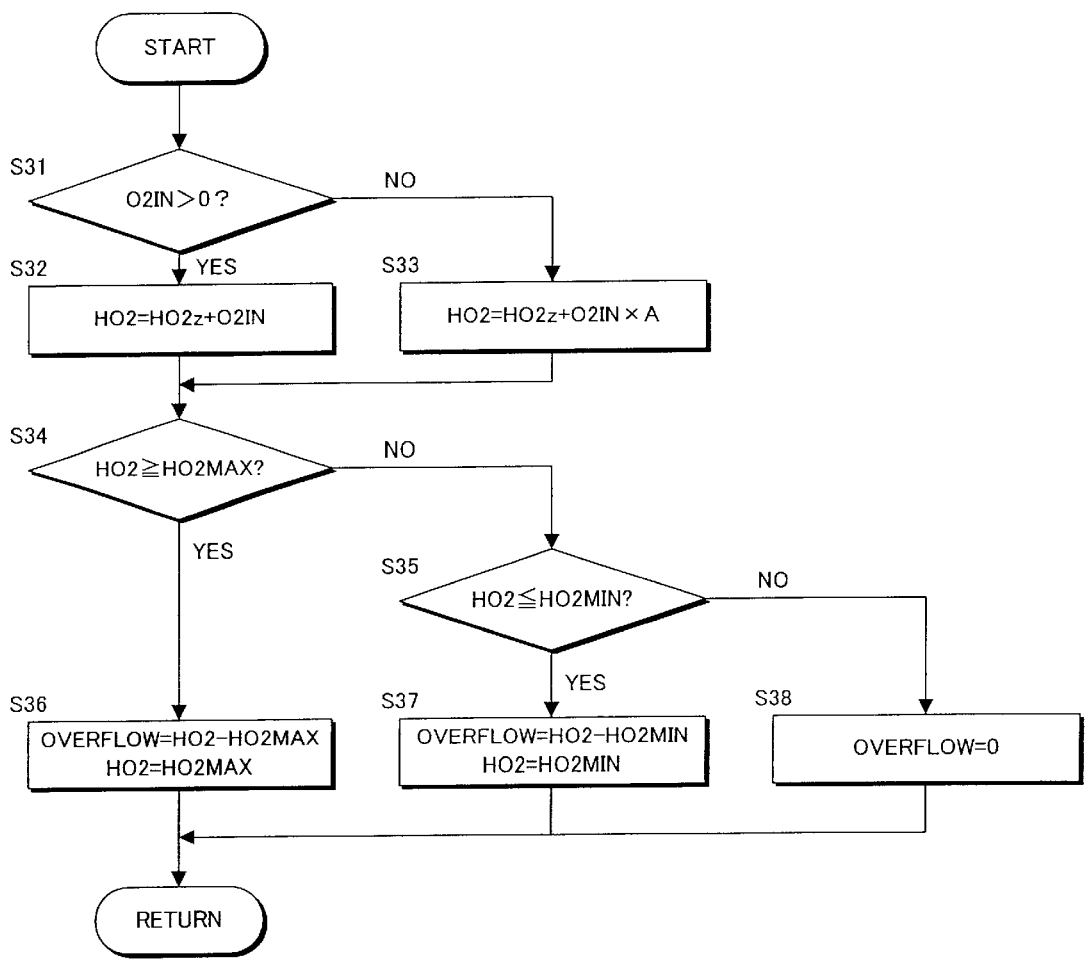
FIG. 6 is a flowchart showing a subroutine for computing the high speed component of the oxygen storage amount.

FIG. 6 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or released based on the oxygen excess/deficiency amount O2IN.

When the air-fuel ratio of the exhaust flowing into the catalyst 3 is lean and the oxygen excess/deficiency amount O2IN is larger than zero, it is determined that the high speed component HO2 is being stored, the routine proceeds to a step S32, and the high speed component HO2 is computed from the following equation (1):

$$HO2=HO2z+O2IN \qquad (1)$$

where: HO2z: value of high speed component HO2 on immediately preceding occasion.

On the other hand, when it is determined that the oxygen excess/deficiency amount O2IN is less than zero and the high speed component is being released, the routine proceeds to a step S33, and the high speed component HO2 is computed from the following equation (2):

$$HO2 = HO2z - O2IN \times A \tag{2}$$

where: A: oxygen release rate of high speed component HO2

In steps S34, S35, it is determined whether or not the computed HO2 exceeds the maximum capacity HO2MAX of the high speed component, or whether it is not less than a minimum capacity HO2MIN (=0).

When the high speed component HO2 is greater than the maximum capacity HO2MAX, the routine proceeds to a step S36, the overflow oxygen amount (excess amount) OVERFLOW flowing out without being stored as the high speed component HO2 is computed from the following equation (3):

$$OVERFLOW = HO2 - HO2MAX \tag{3},$$

and the high speed component HO2 is limited to the maximum capacity HO2MAX.

When the high speed component HO2 is less than the minimum capacity HO2MIN, the routine proceeds to a step S37, the overflow oxygen amount (deficiency amount) OVERFLOW which was not stored as the high speed component HO2 is computed by the following equation (4):

$$OVERFLOW = HO2 - HO2MIN \tag{4},$$

and the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, and zero is set to the overflow oxygen amount OVERFLOW.

Here, when the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 7:
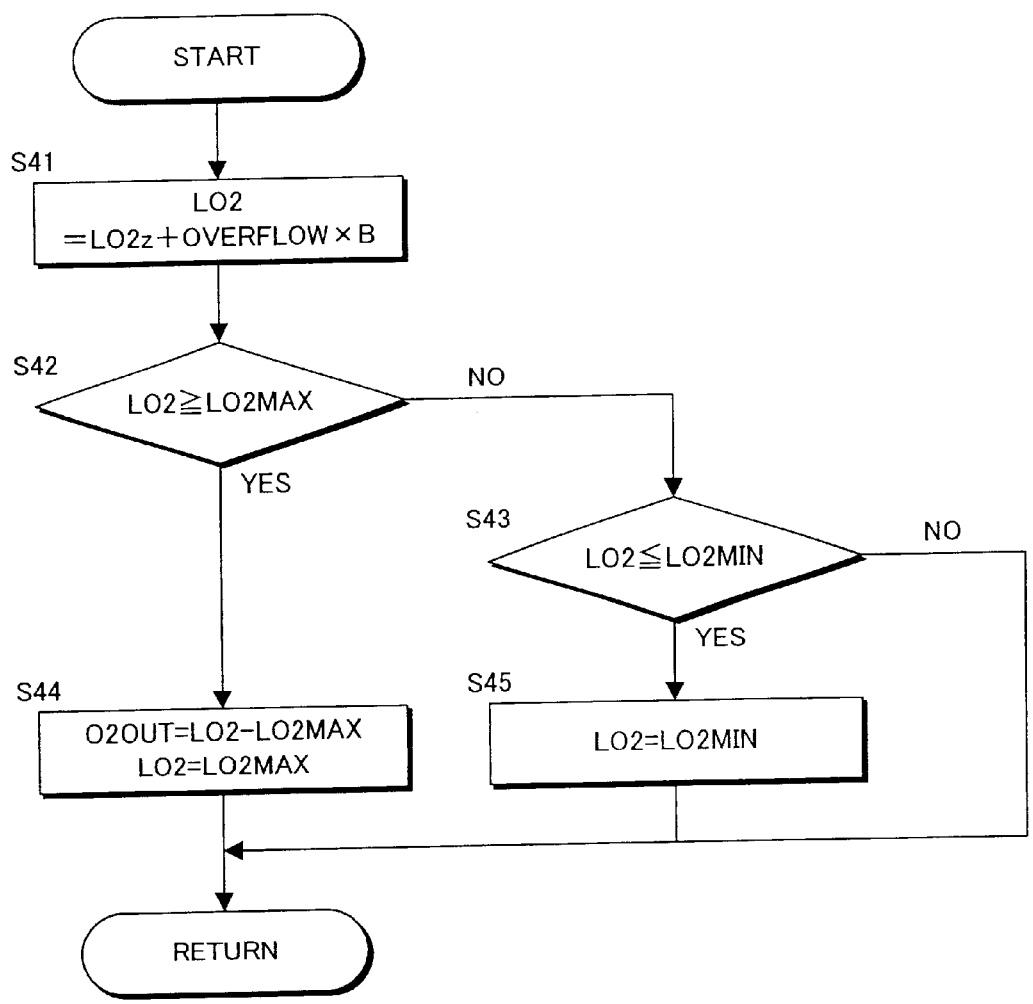
FIG. 7 is a flowchart showing a subroutine for computing a low speed component of the oxygen storage amount.

FIG. 7 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in a step S41, the low speed component LO2 is computed by the following equation (5):

$$LO2 = LO2z + OVERFLOW \times B \tag{5}$$

where: LO2z: immediately preceding value of low speed component LO2, and

B: oxygen storage/release rate of low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to for example a value which is larger the higher the catalyst temperature TCAT or the smaller the low speed component LO2. Also, when the overflow oxygen amount OVERFLOW is negative, oxygen is deficient, and the oxygen release rate at this time may for example be set to a value which is larger the higher the catalyst temperature TCAT or the larger the low speed component LO2.

In steps S42, S43, in the same way as when the high speed component HO2 is computed, it is determined whether or not the computed low speed component LO2 has exceeded a maximum capacity LO2MAX or is less than a minimum capacity LO2MIN (=0).

When maximum capacity LO2MAX is exceeded, the routine proceeds to a step S44, an oxygen excess/deficiency amount O2OUT which has overflowed from the low speed component LO2 is computed from the following equation (6):

$$LO2OUT = LO2 - LO2MAX \tag{6}$$

and the low speed component LO2 is limited to the maximum capacity LO2MAX. The oxygen excess/deficiency amount O2OUT flows out downstream of the catalyst 3.

When the low speed component LO2 is less than the minimum capacity, the routine proceeds to a step S45, and the low speed component LO2 is limited to the minimum capacity LO2MIN.

Next, the resetting of the computed value of the oxygen storage amount performed by the controller 6 will be described. By resetting the computed value of the oxygen storage amount under predetermined conditions, computational errors which have accumulated so far are eliminated, and the computational precision of the oxygen storage amount can be improved.

Figure 8:
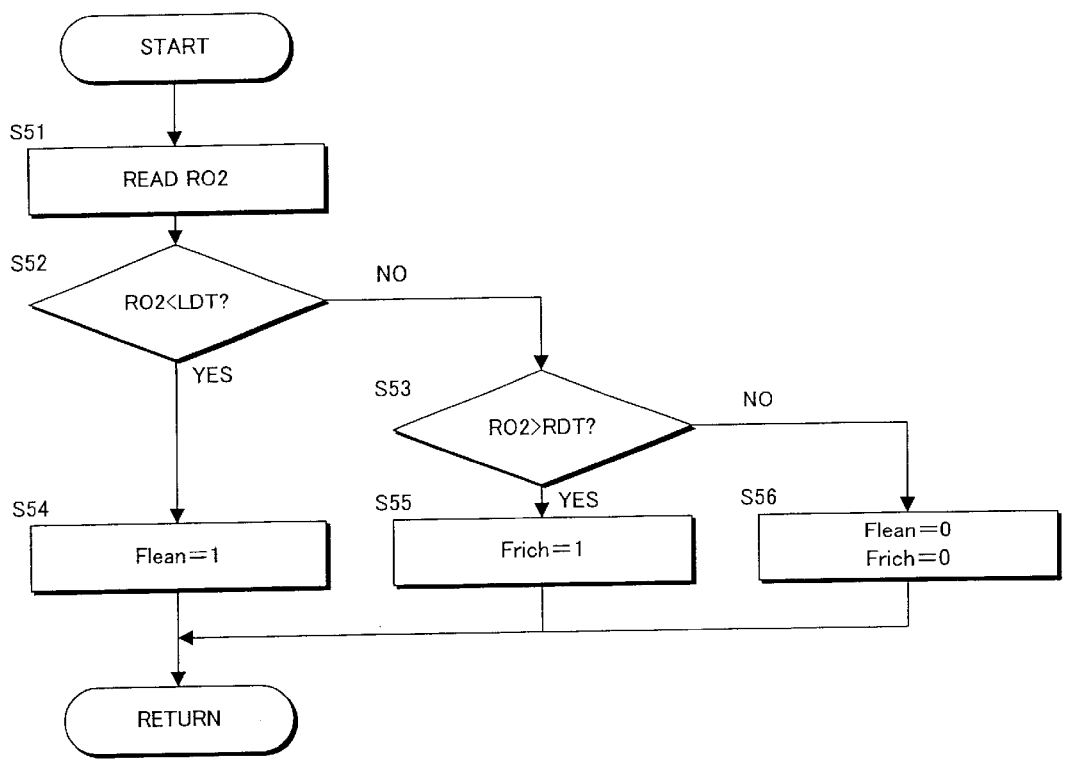
FIG. 8 is a flowchart showing a routine for determining a reset condition.

FIG. 8 shows the details of a routine for determining the reset condition. This routine determines whether or not a condition for resetting the oxygen storage amount (high speed component HO2 and low speed component LO2) holds from the exhaust air-fuel ratio downstream of the catalyst 3, and sets a flag Frich and a flag Flean.

First, in a step S51, the output of the rear oxygen sensor 5 which detects the exhaust air-fuel ratio downstream of the catalyst 3 is read. Subsequently, in a step S52, the rear oxygen sensor output RO2 is compared with a lean determining threshold LDT, and in a step S53, the rear oxygen sensor output RO2 is compared with the rich determining threshold RDT.

As a result of these comparisons, when the rear oxygen sensor output RO2 is less than the lean determining threshold LDT, the routine proceeds to a step S54, and the flag Flean is set to "1" showing that the lean reset condition for the oxygen storage amount holds. When the rear oxygen sensor output RO2 exceeds the rich determining threshold RDT, the routine proceeds to a step S55, and the flag Frich is set to "1" showing that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 9:
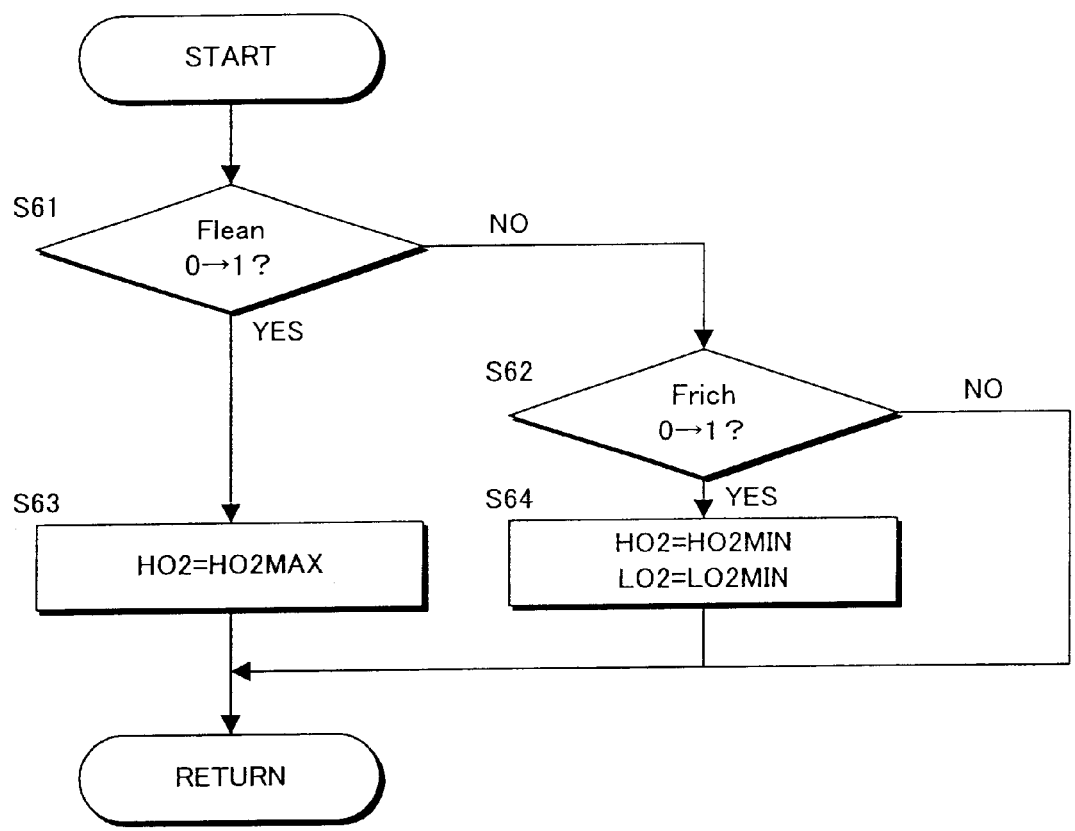
FIG. 9 is a flowchart showing a routine for performing reset of the computed oxygen storage amount.

FIG. 9 shows a routine for resetting the oxygen storage amount.

According to this, in steps S61, S62, it is determined whether or not the lean reset conditions or rich reset conditions hold based on the variation of the values of the flags Flean and Frick When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 and low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst even if the low speed component LO2 has not reached maximum capacity when the high speed component HO2 reaches maximum capacity, and when the exhaust air-fuel ratio downstream of the catalyst becomes lean, it may be considered that at least the high speed component HO2 has reached maximum capacity.

When the exhaust air fuel ratio downstream of the catalyst becomes rich, oxygen is not released from the low speed component LO2 which is released slowly. Therefore, it may be considered that the high speed component HO2 and low speed component LO2 are both not being stored and are at minimum capacity.

Next, the air-fuel ratio control performed by the controller 6 (oxygen storage amount constant control) will be described.

Figure 10:
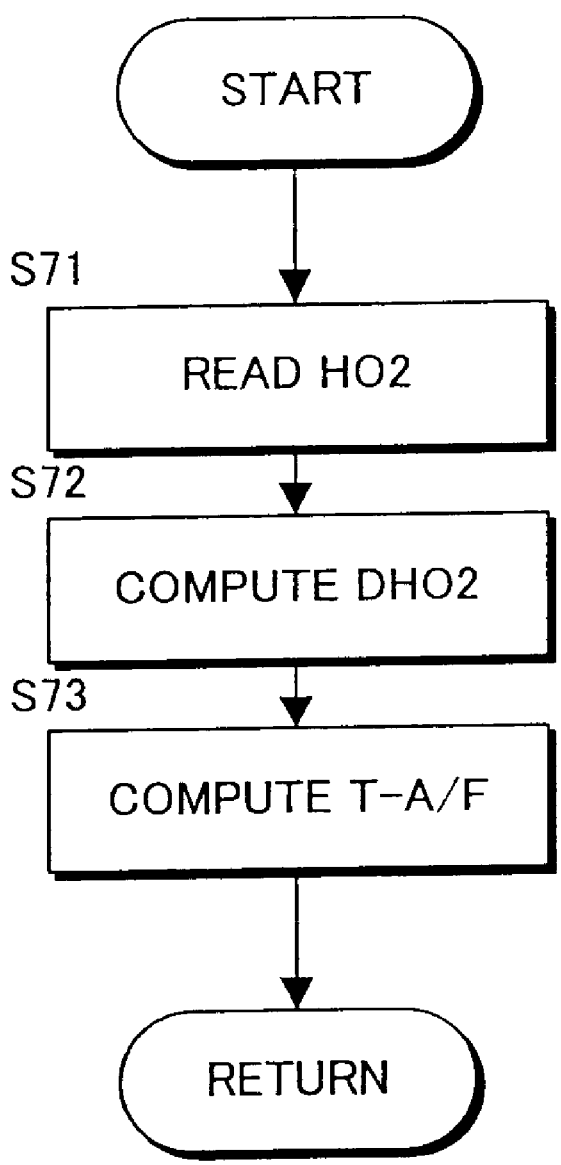
FIG. 10 is a flowchart showing a routine for computing a target air fuel ratio based on the oxygen storage amount.

FIG. 10 shows a routine for computing a target air fuel ratio based on the oxygen storage amount.

According to this, in a step S71, the high speed component HO2 of the present oxygen storage amount is read. In a step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component.

In a step S73, the computed deviation DHO2 is converted to an air-fuel ratio equivalent value, and a target air-fuel ratio T-A/F of the engine 1 is set.

Therefore, according to this routine, when the high speed component HO2 of the oxygen storage amount does not reach a target amount, the target air fuel ratio of the engine 1 is set to lean, and the oxygen storage amount (high speed component HO2) is increased. On the other hand, when the high speed component HO2 exceeds the target amount, the target air fuel ratio of the engine 1 is set to rich, and the oxygen storage amount (high speed component HO2) is decreased.

Next, the overall action performed by the above control will be described.

In the exhaust purification device according to this invention, when the engine 1 starts, computation of the oxygen storage amount of the catalyst 3 begins, and air fuel ratio control of the engine 1 is performed so that the oxygen storage amount of the catalyst 3 is constant to maintain the conversion efficiency of the catalyst 3 at a maximum.

The oxygen storage amount of the catalyst 3 is estimated based on the air-fuel ratio of the exhaust gas flowing into the catalyst 3 and the intake air amount, and computation of the oxygen storage amount is divided into the high speed component HO2 and low speed component LO2 according to the actual characteristics.

Specifically, the computation is performed assuming that when oxygen is stored, the high speed component HO2 is preferentially stored, and the low speed component LO2 begins to be stored when the high speed component HO2 can no longer be stored. The computation also assumes that when oxygen is released, when the ratio (LO2/HO2) of the low speed component LO2 and high speed component HO2 is less than the predetermined value AR, oxygen is preferentially released from the high speed component HO2, and when the ratio LO2/HO2 reaches the predetermined value AR, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to rich, and when it is less than the target value, the high speed component HO2 is increased by controlling the air-fuel ratio to lean.

As a result, the high speed component HO2 of the oxygen storage amount is maintained at the target value, and even if the air-fuel ratio of the exhaust flowing into the catalyst 3 shifts from the stoichiometric air-fuel ratio, oxygen is immediately stored as the high speed component HO2 or immediately released as the high speed component HO2 which has a high responsiveness, the catalyst atmosphere is corrected to the stoichiometric air-fuel ratio, and the conversion efficiency of the catalyst 3 is maintained at a maximum.

Further, if computational errors accumulate, the computed oxygen storage amount shifts from the real oxygen storage amount, however the oxygen storage amount (high speed component HO2 and low speed component LO2) is reset with a timing at which the exhaust downstream of the catalyst 3 becomes rich or lean, and any discrepancy between the computed value and real oxygen storage amount is corrected.

Figure 11:
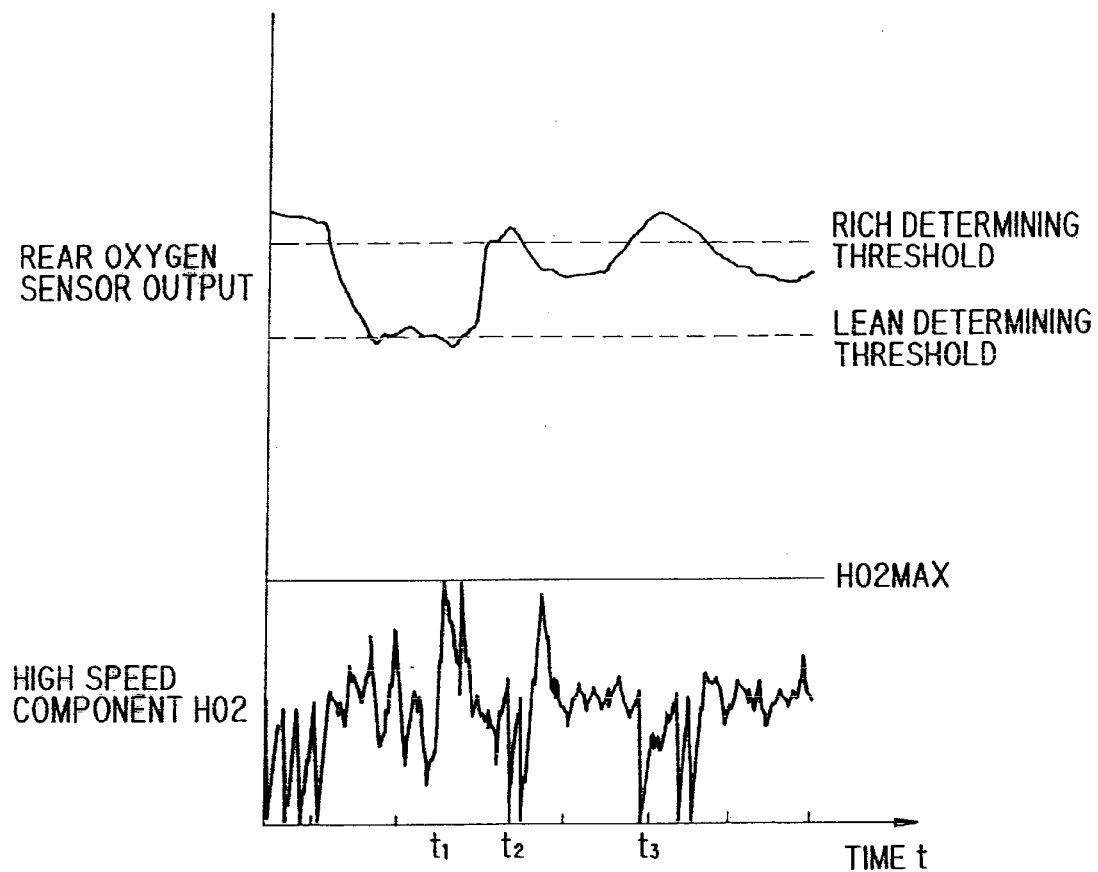
FIG. 11 is a diagram showing how a rear oxygen sensor output and high speed component vary when the oxygen storage amount is controlled to be constant.

FIG. 11 shows how the high speed component HO2 varies when the above oxygen storage amount constant control is performed.

In this case, at the time t1, the output of the rear oxygen sensor 5 becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed, not shown.

At times t2, t3, the output of the rear oxygen sensor 5 becomes greater than the rich determining threshold and rich reset conditions hold, so the high speed component HO2 of the oxygen storage amount is reset to the minimum capacity (=0). The low speed component LO2 at this time is also reset to the minimum capacity, not shown.

Thus, resetting of the computed values of the oxygen storage amount is performed with a timing at which the air-fuel ratio of the exhaust downstream of the catalyst 3 becomes rich or lean, and as a result of the discrepancy from the real oxygen storage amount being corrected, the computational precision of the oxygen storage amount of the catalyst is further enhanced, the precision of air-fuel ratio control for maintaining the oxygen storage amount constant is increased, and the conversion efficiency of the catalyst is maintained at a high level.

The above shows an example of an exhaust purification device assumed by this invention. In this invention, in such an exhaust purification device which controls the oxygen storage amount of a catalyst to be constant, the object is to determine catalyst deterioration with high accuracy.

Hereafter, this will be described referring to FIG. 12 and subsequent drawings.

Figure 12:
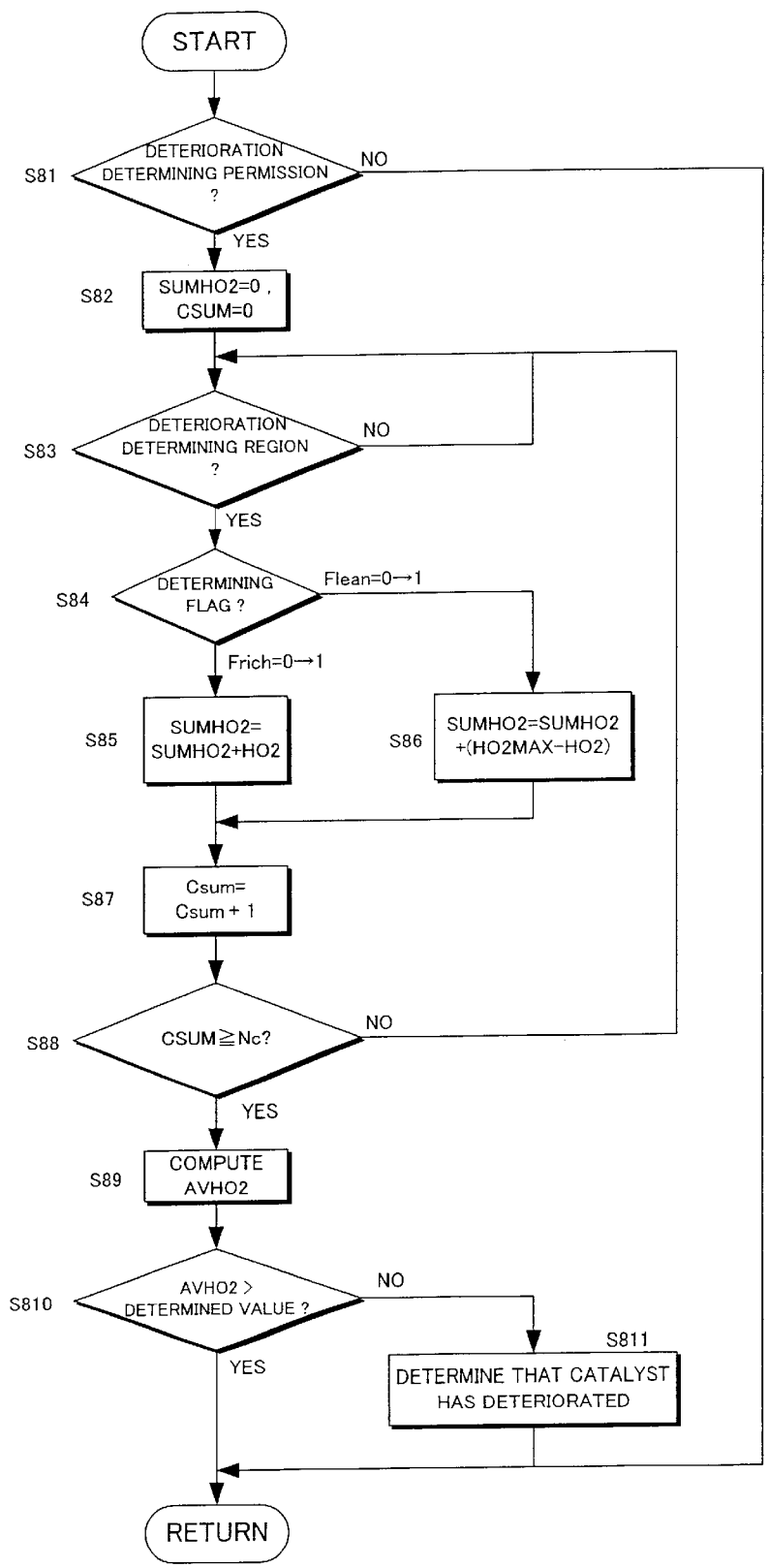
FIG. 12 is a flowchart showing the details of a processing routine according to a first embodiment related to catalyst deterioration determination.
Figure 13:
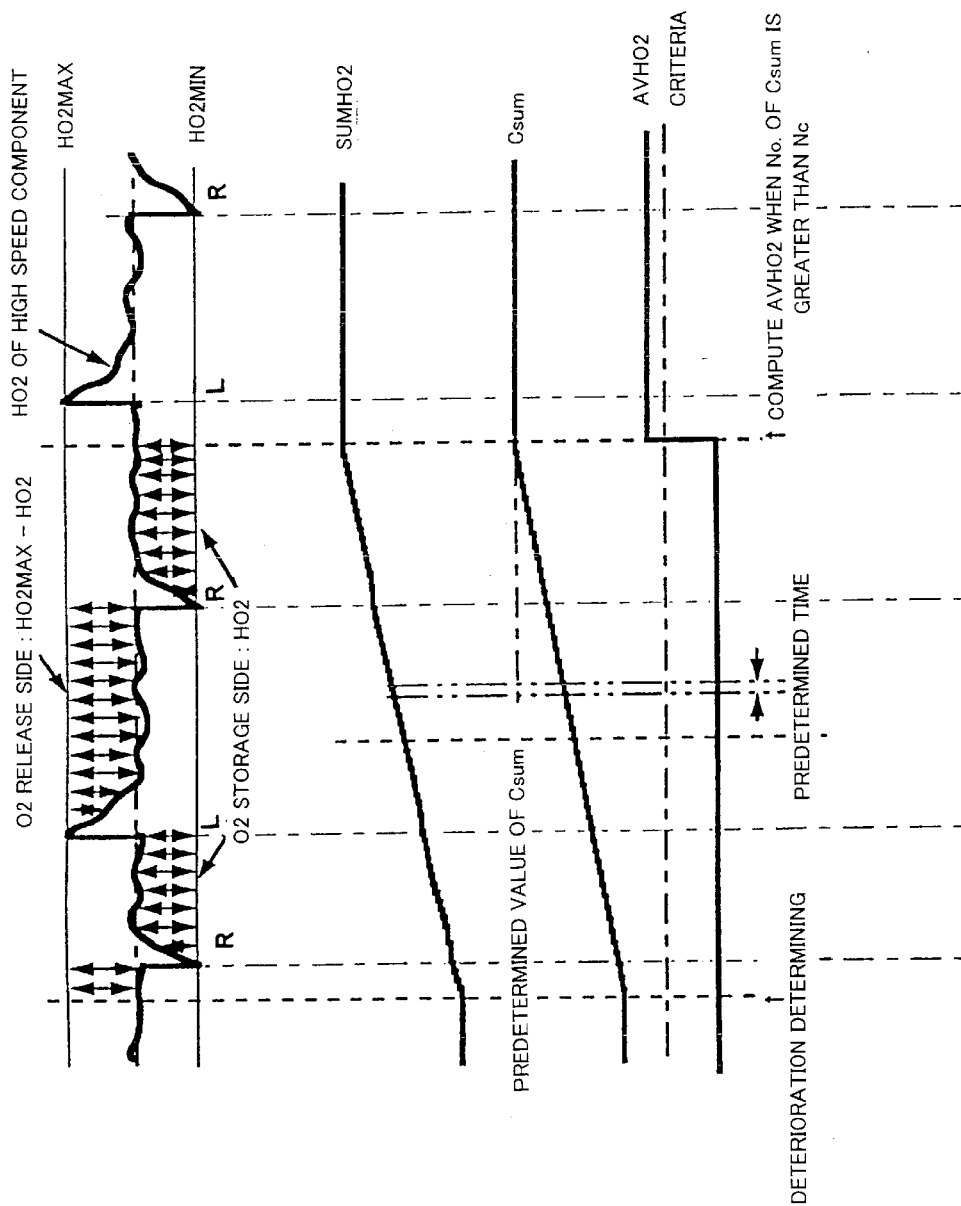
FIG. 13 is a flowchart showing how processing is performed according to the aforesaid first embodiment.

FIG. 12 is a processing routine in a first embodiment for determining catalyst deterioration, and is periodically performed in synchronism with the air-fuel ratio control processing of FIG. 10. FIG. 13 is a diagram showing how the oxygen storage amount varies when the aforesaid processing routines are executed. According to this embodiment, the high speed component of the oxygen storage amount is basically sampled a predetermined number of times, and an average value of the oxygen storage amount computed from this integrated value is compared with a predetermined reference value to determine catalyst deterioration.

In this processing, a deterioration determining permission condition is first determined in a step S81. This is done for example by determining whether or not a catalyst 3 is in an activated state based on a water temperature or catalyst temperature, and permitting a deterioration determination to be made when the catalyst is in the activated state. An integrated value SUMHO2 of the oxygen storage amount and a counter Csum for integral management are respectively initialized to 0, and the routine proceeds to a subsequent determination of a deterioration determining region condition (steps S82, S83). The deterioration determining region condition may for example be an engine rotation speed, fuel injection amount, vehicle speed or air-fuel ratio control state, and a determination is performed as to whether or not running conditions determined from these are within predetermined conditions. In this way, an appropriate deterioration determination can be performed excluding running conditions which are unsuitable for the determination such as fuel cut during deceleration. When the deterioration determining permission condition is not satisfied, the present processing is terminated, and the system enters a waiting state until the condition is satisfied.

When catalyst deterioration is determined, it is first determined whether the oxygen storage amount is being controlled after the aforesaid rich reset, or controlled during the aforesaid lean reset in a step S84. This is determined for example by referring to flags Frich and Flean used in the processing of FIG. 9. Specifically, when the flag Frich=1 and the flag Flean=0, control is being performed after a rich reset, and when Frich=0 and Flean=1, control is being performed after the lean reset. Herein, when control is being performed after the rich reset, an oxygen storage amount HO2 is added to the integrated value SUMHO2, and processing is performed to update SUMHO2 in a step S85. On the other hand, when control is being performed after a lean reset, the result of subtracting the oxygen storage amount HO2 from the maximum oxygen amount HO2MAX of the catalyst is added to the integrated value SUMHO2 to update SUMHO2 in a step S86. In FIG. 13, the symbol R denotes the rich reset, and the symbol L denotes the lean reset. In this example, the deterioration determination starts immediately prior to the rich reset.

The computation of the aforesaid integrated value SUMHO2 is repeated until the counter value Csum reaches a predetermined sampling number Nc in steps S87, S88. In other words, due to this processing, the oxygen storage amount HO2 per unit time is integrated Nc times.

Next, the integrated value SUMU02 found in this way is divided by the sampling number Nc to compute an average value AVHO2 of the oxygen storage amount HO2 in a step S89, and this average value AVHO2 is compared with a predetermined determining value. If AVHO2>the determining value, it is determined that the deterioration level is still acceptable and the present processing is terminated, whereas if AVHO2<the determining value, it is determined that the catalyst has deteriorated in steps S810, S811. The result of this deterioration determination is stored for example in a self-diagnostic device of the vehicle, or it may be notified to the driver in real time by a monitor lamp or the like. FIG. 13 shows the result where AVHO2 is larger than the determining value, i.e., when deterioration of the catalyst 4 is still OK.

In this embodiment, the oxygen storage amount of the catalyst may be divided into a high speed component which is stored or released by a catalyst noble metal such as Pt, Rh, Pd, and a low speed component which is stored or released relatively slowly by an oxygen storage material such as ceria. As the high speed component has a high storage rate or release rate (referred to hereafter as "storage/release rate") from the catalyst compared to the low speed component, the oxygen storage amount is very sensitive to air-fuel ratio fluctuation and catalyst deterioration. Therefore, catalyst deterioration may be determined with a good response by using the result of integrating the high speed component of the oxygen storage amount.

As one method of determining deterioration from the integrated value of the oxygen storage amount, a determining reference value may be provided and determined relative to the integrated value, an average value of the oxygen storage amount computed from this integrated value, and compared with the determining value. This allows the deterioration to be determined with higher reliability.

There is no need to process detection parameters to determine deterioration apart from those used in the control of the air-fuel ratio and oxygen storage amount, such as the computation result of the oxygen storage amount, so the processing programme for determining deterioration can be simplified.

Further, the total oxygen storage amount is computed from the high speed component which has a relatively high oxygen storage/release rate, and low speed component which has a lower oxygen storage/release rate, so deterioration can be determined with still higher accuracy.

Figure 14:
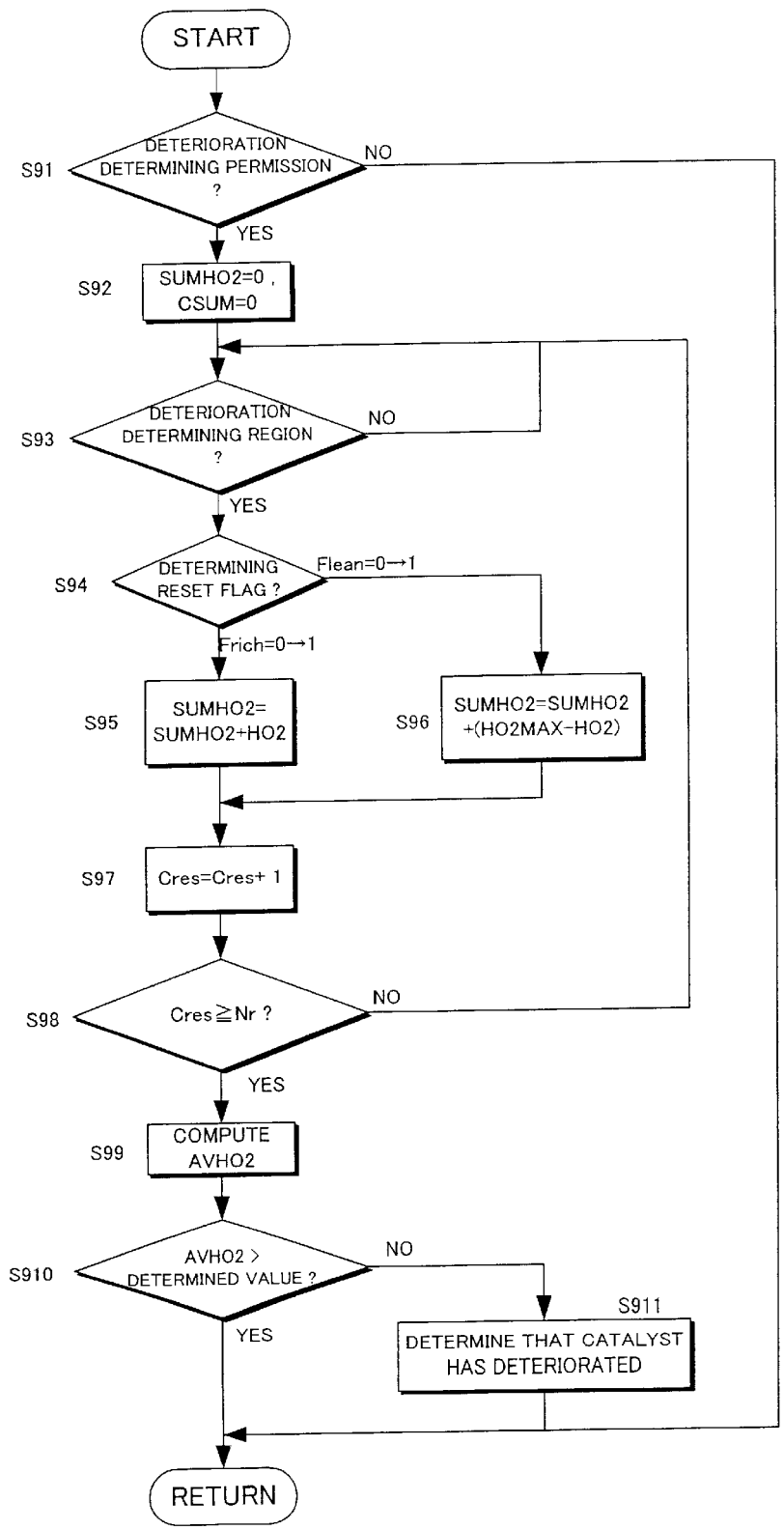
FIG. 14 is a flowchart similar to FIG. 12, but showing the details of a processing routine according to a second embodiment related to catalyst deterioration determination.
Figure 15:
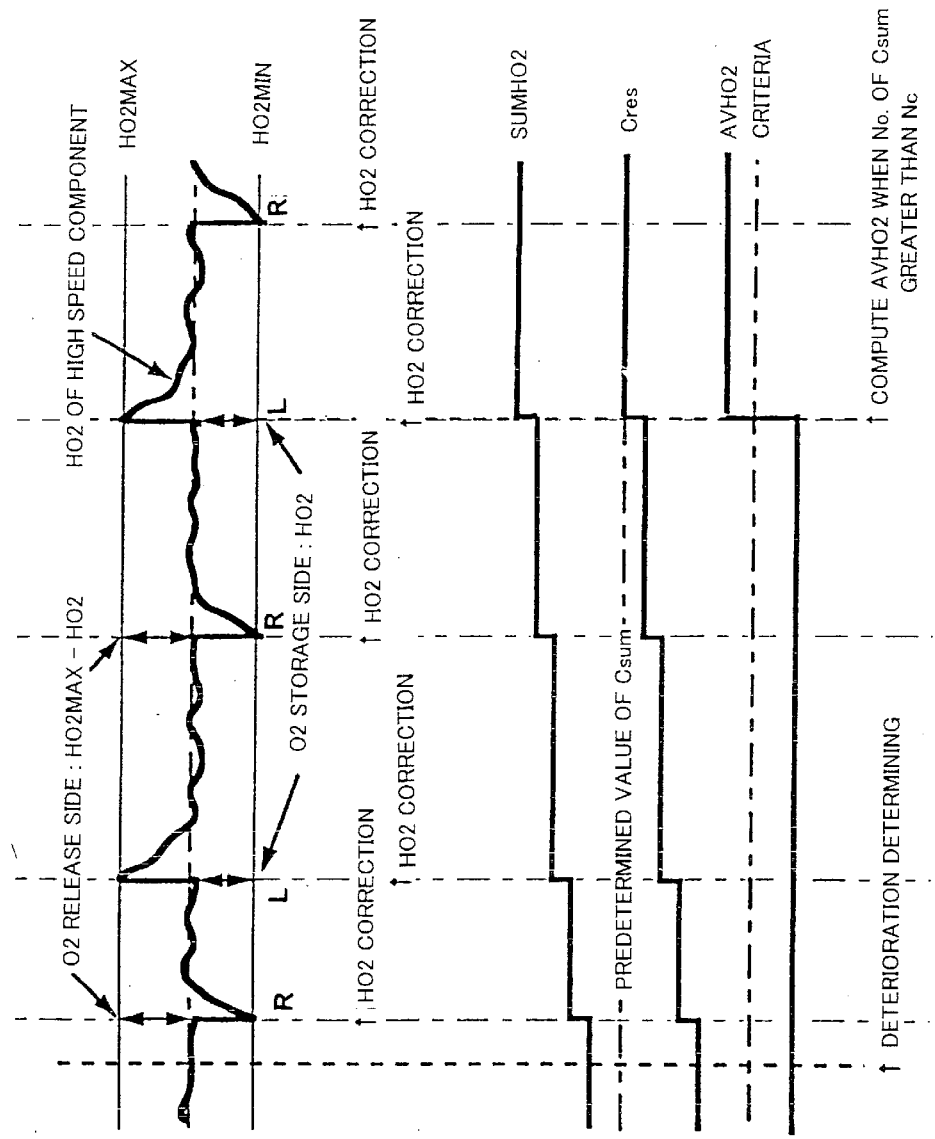
FIG. 15 is a diagram similar to FIG. 13, but showing how processing is performed according to the aforesaid second embodiment.

FIG. 14 is showing a processing routine in a second embodiment for determining catalyst deterioration, and is periodically performed in synchronism with the air-fuel ratio control processing of FIG. 10. FIG. 15 is a diagram showing how the oxygen storage amount varies when the aforesaid processing routine is executed. According to this embodiment, the catalyst deterioration is determined by sampling the high speed component of the oxygen storage amount a predetermined number of times each time the reset processing is performed, and comparing the average value of the oxygen storage amount computed from this integrated value with a determining value.

In this processing, a deterioration determining permission condition is determined in the same way as in FIG. 12 (a step S91), and when deterioration determination in the catalyst activation state is permitted, the integrated value SUMHO2 of the oxygen storage amount and a counter Cres for integral management are respectively initialized to 0, and the routine then shifts to determination of the deterioration determining region condition in steps S92, S93. The deterioration determining region condition is identical to that of FIG. 12, and is based on various engine running state parameters including the engine rotation speed. When the deterioration determining permission condition is not satisfied, the present routine is terminated, and the system waits until the condition is satisfied.

In determining catalyst deterioration, it is first determined whether or not a rich reset or lean reset is performed by referring to the flags Frich and Flean used in the processing of the FIG. 9 (a step S94). Here, it is known that when the flag Frich inverts from 0 to 1, a rich reset is performed, and when the flag Flean inverts from 0 to 1, a lean reset is performed. When a lean reset is performed, the oxygen storage amount HO2 immediately prior to reset is added to the integrated value SUMHO2 to update SUMHO2 in a step S95. Conversely, when a rich reset is performed, the result of subtracting the storage amount HO2 immediately prior to reset from the maximum oxygen storage amount HO2MAX is added to the integrated value SUMHO2 to update SUMHO2 in a step S96.

The computation of the integrated value SUMHO2 is repeated until the counter value Cres reaches a predetermined number Nr in steps S97, S98. In other words, due to this processing, the oxygen storage amount HO2 immediately prior to reset during the interval when rich reset or lean reset is performed Nr times, is integrated.

Next, the integrated value SUMU02 found in this way is divided by the detection number Nr to compute the average value AVHO2 of the oxygen storage amount HO2 in a step S99, and this average value AVHO2 is compared with a predetermining value. When AVHO2>the determining value, it is determined that the deterioration level is still acceptable and the routine is terminated, whereas when AVHO2<the determining value, it is determined that the catalyst has deteriorated in steps S910, S911. The result of this determination may be stored for example in a self-diagnostic device of the vehicle, or may be notified to the driver in real time by a monitor lamp or the like. FIG. 15 shows the case where the average value AVHO2 is larger than the determining value, i.e. it shows the determining result when there is no deterioration.

As the above embodiment, when the deterioration is determined by integrating the oxygen storage amount each time reset processing is performed which initializes the oxygen storage amount, the oxygen storage amount may for example be detected before each reset, and an integrated value calculated by integrating this, excluding oxygen storage amounts which had a large variation due to reset processing, hence the deterioration may be detected with higher accuracy. It may be noted that the integrated value of the oxygen storage amount may be determined during a predetermined time span or number of samplings regardless of whether or not reset is performed, and in this case, as the duration can be determined without waiting for reset processing, the deterioration determining timing can be shortened.

Figure 16:
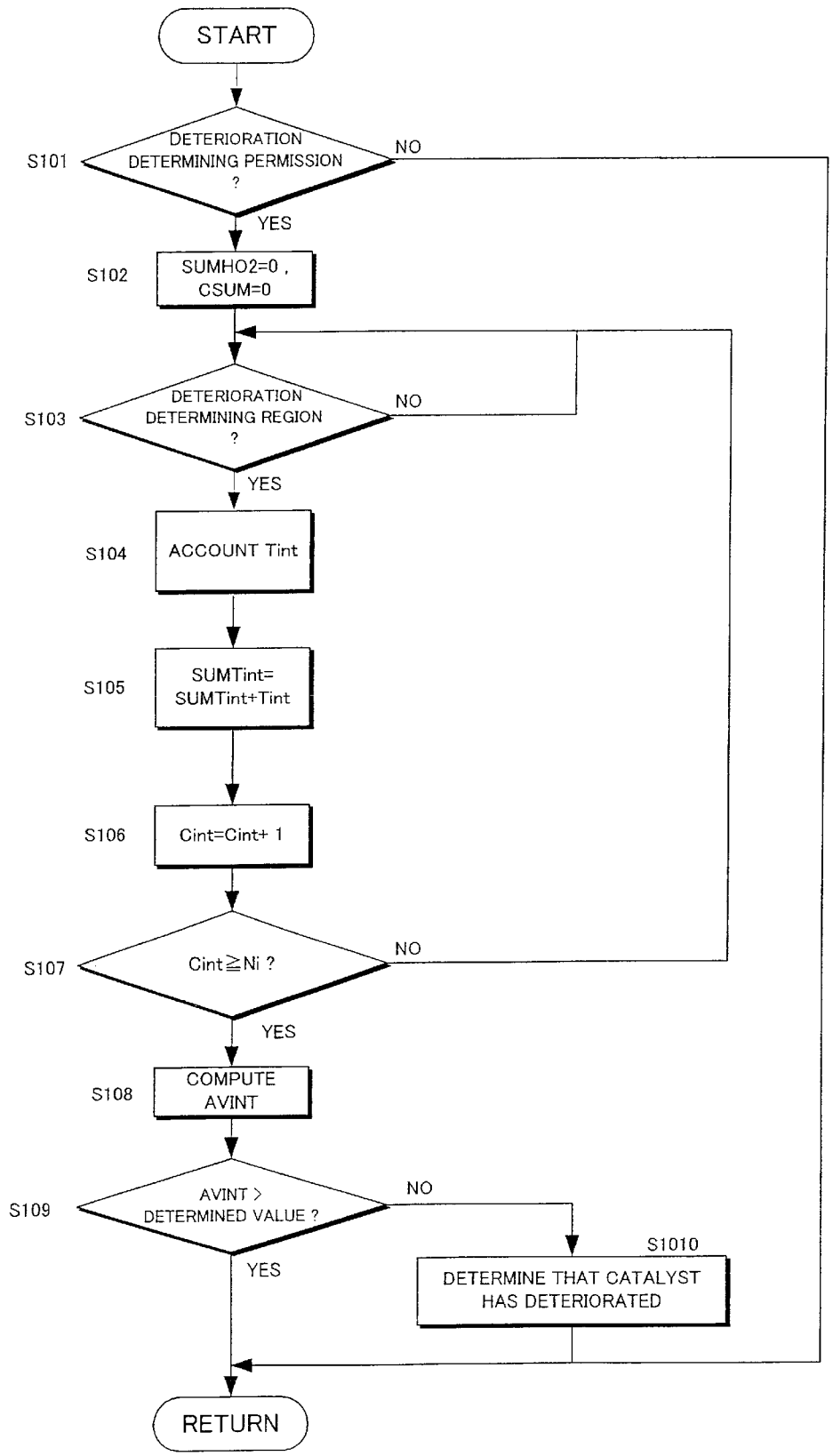
FIG. 16 is a flowchart similar to FIG. 12, but showing the details of a processing routine according to a third embodiment related to catalyst deterioration determination.

FIG. 16 is showing a routine in a third embodiment for determining catalyst deterioration, and is periodically performed in synchronism with the processing of the air-fuel ratio control of FIG. 10. In this embodiment, the reset frequency of the high speed component is detected, and the catalyst deterioration is determined by comparing this with a determining value.

In this processing, a deterioration determining permission condition is first determined as in FIG. 12 (step S101). When deterioration determination is permitted in the catalyst activation state, an integrated value SUMTint between resets and a counter Cint for integral management are respectively initialized to 0, and the routine then shifts to determination of the following deterioration determining region condition in steps S102, S103. The deterioration determining region condition is identical to that of FIG. 12, and is determined based on various running parameters including the engine rotation speed. When the deterioration determining permission condition is not satisfied, the present processing is terminated, and the system waits until the condition is satisfied.

To determine the catalyst deterioration, the presence or absence of rich reset or lean reset is first detected, and when either of these is performed, a time Tint until the next reset is performed is measured in a step S104. This measures the time from R to L in FIG. 13 or from L to R in FIG. 15 by for example referring to the flags Frich and Flean used in the processing of FIG. 9.

Next, the measured time Tint is added to an integrated value SUMTint on each occasion that this time measurement is performed to update SUMTint, and increase the counter value Cint. This processing is repeated until the counter value Cint reaches a predetermined number Ni, i.e., the reset time interval Tint is integrated Ni times in steps S105, S107.

Next, the integrated value SUMTint found in this way is divided by the detection number Ni to compute an average value AVTINT of the reset time interval in a step S108, and this average value AVTINT is compared with a predetermined determining value. When AVTINT>the determining value, it is determined that the deterioration level is still acceptable and the present processing is terminated, and when AVTINT<the determining value, it is determined that there is catalyst deterioration in steps S109, S110. The result of this deterioration determination is for example stored in a self-diagnostic device of the vehicle, or catalyst deterioration is notified in real time to the driver by a monitor lamp or the like based on this result.

In this embodiment, when catalyst deterioration progresses, the oxygen storage amount decreases, so the fluctuation width of the airfuel ratio of the catalyst atmosphere increases during the air-fuel ratio control process, and the frequency with which a lean determining value or rich determining value is exceeded, i.e. the frequency of reset processing, increases. Therefore, the frequency of this reset processing may be monitored, and the catalyst determined to have deteriorated when this exceeds a predetermined reference value.

There is no need to process detection parameters to determine deterioration apart from those used in the control of the air-fuel ratio and oxygen storage amount, such as the computation result of the oxygen storage amount, so the processing programme for determining deterioration can be simplified.

Further, the total oxygen storage amount is computed from the high speed component which has a relatively high oxygen storage/release rate, and low speed component which has a lower oxygen storage/release rate, so deterioration can be determined with still higher accuracy.

The embodiments of this invention in which an exclusive property or privilege is claimed are defined.

The contents of Japanese Application No. 2000-49185, with a filing date Feb. 25, 2000 is hereby incorporated by reference.

The embodiments of this invention in which an exclusive property or privilege is claimed are defined.

Industrial Applicability

As described above, the exhaust purification device according to the present invention is useful as an exhaust purification device permitting determination of catalyst deterioration without depending on the output inversion of the exhaust oxygen sensor.

What is claimed is:

1. An engine exhaust purification device comprising:
   a catalyst provided in an engine exhaust passage,
   a first sensor which detects an exhaust characteristic flowing into the catalyst,
   a second sensor which detects an air-fuel ratio of an exhaust flowing out of the catalyst, and a microprocessor programmed to:
  compute an oxygen storage amount of the catalyst using the detected exhaust characteristic,
  compute a target air-fuel ratio of the engine based on the computed oxygen storage amount such that the oxygen storage amount of the catalyst is a predetermined target value,
  determine a deterioration of the catalyst based on an integrated value of the oxygen storage amount for a predetermined time,
  perform reset processing which initializes the oxygen storage amount to a maximum value when the air-fuel ratio of the exhaust from the catalyst detected via the second sensor exceeds a lean determining value, and initializes the oxygen storage amount to a minimum value when the air-fuel ratio of the exhaust from the catalyst detected via the second sensor exceeds a rich determining value, and
  determine that the catalyst has deteriorated based on the integrated value of the oxygen storage amount on each occasion reset processing is performed.

2. The engine exhaust purification device as defined in claim 1, wherein the microprocessor is programmed to compute the catalyst oxygen storage amount from a high speed component which has a relatively high oxygen absorption/release rate, and a low speed component which has a lower oxygen absorption/release rate than the high speed component.

3. The engine exhaust purification device as claimed in claim 1, wherein the exhaust characteristic is air-fuel ratio or an oxygen concentration.

4. An engine exhaust purification device comprising:
a catalyst provided in an engine exhaust passage,
a sensor which detects an exhaust characteristic flowing into the catalyst, and
a microprocessor programmed to:
  compute an oxygen storage amount of the catalyst using the detected exhaust characteristic,
  compute a target air-fuel ratio of the engine based on the computed oxygen storage amount such that the oxygen storage amount of the catalyst is a predetermined target value, and
  determine a deterioration of the catalyst based on an integrated value of the oxygen storage amount for a predetermined time, wherein the oxygen storage amount of the catalyst is calculated from a high speed component which has a relatively high oxygen absorption/release rate.

5. The engine exhaust purification device as defined in claim 4, wherein the microprocessor is programmed to compute the catalyst oxygen storage amount from a high speed component which has a relatively high oxygen absorption/release rate, and a low speed component which has a lower oxygen absorption/release rate than the high speed component.

6. The engine exhaust purification device as defined in claim 4, wherein the exhaust characteristic is air-fuel ratio or an oxygen concentration.

7. An engine exhaust purification device comprising:
a catalyst provided in an engine exhaust passage,
a first sensor which detects an exhaust characteristic of exhaust flowing into the catalyst,
a second sensor which detects an air-fuel ratio of exhaust flowing out of the catalyst, and
a microprocessor programmed to:
  compute an oxygen storage amount of the catalyst using the detected exhaust characteristic,
  perform reset processing which initializes the oxygen storage amount to a maximum value when the air-fuel ratio of the exhaust from the catalyst detected via the second sensor exceeds a lean determining value, and initializes the oxygen storage amount to a minimum value when the air-fuel ratio of the exhaust from the catalyst detected via the second sensor exceeds a rich determining value,
  compute a target air-fuel ratio of an engine so that the oxygen storage amount of the catalyst is a predetermined target value based on the computed oxygen storage amount, and
  compare a reset processing frequency with a determining value, and determine that the catalyst has deteriorated when the reset processing frequency exceeds the determining value.

8. The engine exhaust purification device as defined in claim 7, wherein the microprocessor is programmed to compute the catalyst oxygen storage amount from a high speed component which has a relatively high oxygen absorption/release rate, and a low speed component which has a lower oxygen absorption/release rate than the high speed component.

9. The engine exhaust purification device as defined in claim 7, wherein the exhaust characteristic is air-fuel ratio or an oxygen concentration.

10. An engine exhaust purification device comprising:
a catalyst provided in an engine exhaust passage,
a sensor which detects an exhaust characteristic flowing into the catalyst, and
a microprocessor programmed to:
  compute an oxygen storage amount of the catalyst using the detected exhaust characteristic,
  compute a target air-fuel ratio of the engine based on the computed oxygen storage amount such that the oxygen storage amount of the catalyst is a predetermined target value,
  determine a deterioration of the catalyst based on an integrated value of the oxygen storage amount for a predetermined time, and
  compute the catalyst oxygen storage amount from a high speed component which has a relatively high oxygen absorption/release rate, and a low speed component which has a lower oxygen absorption/release rate than the high speed component.

11. An engine exhaust purification device comprising:
a catalyst provided in an engine exhaust passage,
means for detecting an exhaust characteristic of exhaust flowing into the catalyst,
means for detecting an air-fuel ratio of exhaust flowing out of the catalyst,
means for computing the oxygen storage amount of the catalyst using the detected exhaust characteristic,
means for performing reset processing which initializes the oxygen storage amount to a maximum value when the air-fuel ratio of the exhaust from the catalyst detected via the means for detecting an air-fuel ratio exceeds a lean determining value, and initializes the oxygen storage amount to a minimum value when the air-fuel ratio of the exhaust from the catalyst detected via the means for detecting an air-fuel ratio exceeds a rich determining value,
means for computing a target air-fuel ratio of an engine so that the oxygen storage amount of the catalyst is a predetermined target value based on the computed oxygen storage amount, means for comparing a reset processing frequency with a determining value, and means for determining that the catalyst has deteriorated when the reset processing frequency exceeds the determining value.

12. A method for determining a deterioration of a catalyst, comprising:

computing an oxygen storage amount of the catalyst using a detected exhaust characteristic, performing reset processing which initializes the oxygen storage amount to a maximum value when an air-fuel ratio of the exhaust from the catalyst detected via a second sensor exceeds a lean determining value, and initializes the oxygen storage amount to a minimum value when the air-fuel ratio of the exhaust from the catalyst detected via the second sensor exceeds a rich determining value, computing a target air-fuel ratio of an engine so that the oxygen storage amount of the catalyst is a predetermined target value based on the computed oxygen storage amount, comparing a reset processing frequency with a determining value, and determining that the catalyst has deteriorated when the reset processing frequency exceeds the determining value.

* * * * *